UNITED STATES PATENT OFFICE.

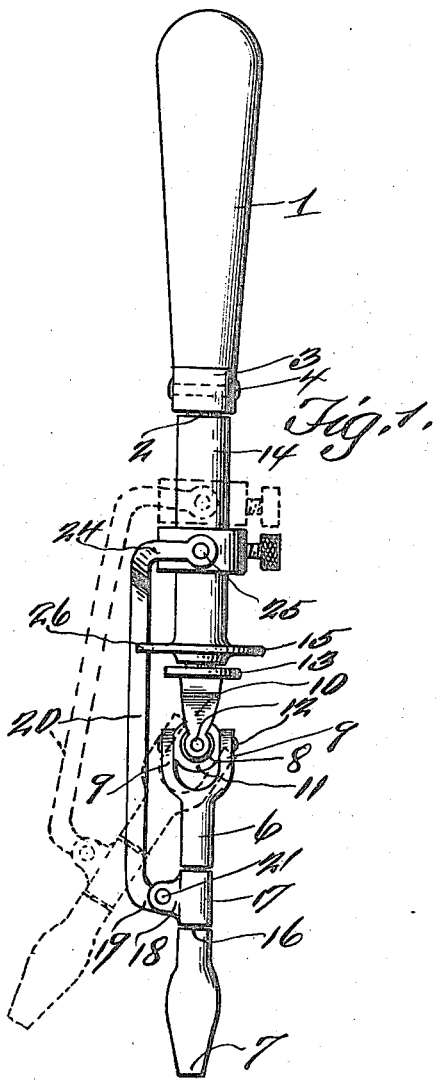
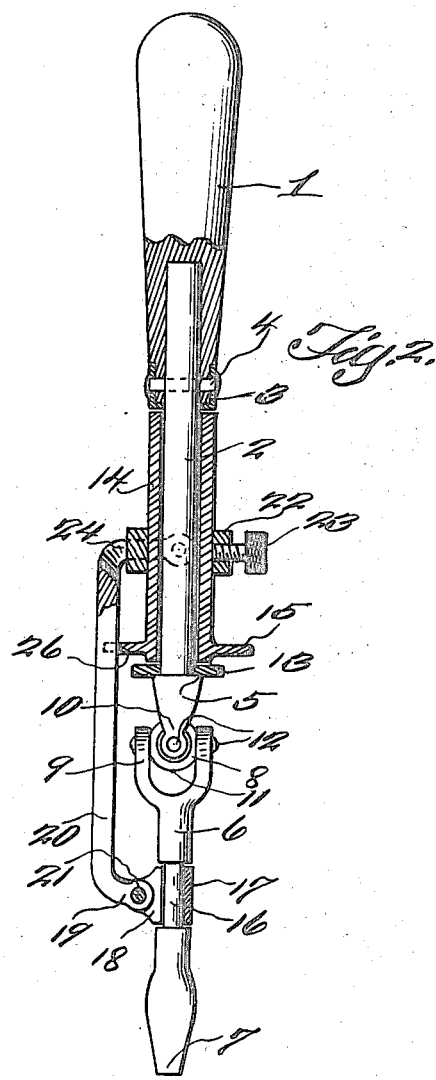

GEORGE TOWNILL, OF PLAINFIELD, ILLINOIS.

UNIVERSAL SCREW-DRIVER.

1,239,847.　　　　Specification of Letters Patent.　　Patented Sept. 11, 1917.

Application filed January 12, 1917.　Serial No. 142,049.

*To all whom it may concern:*

Be it known that I, GEORGE TOWNILL, a citizen of the United States, residing at Plainfield, in the county of Will, State of Illinois, have invented a new and useful Universal Screw-Driver; and I do hereby declare the following to be a full, clear, and exact description of the invention, such as will enable others skilled in the art to which it appertains to make and use the same.

This invention relates to a new and useful universally connected sectional screw driver, and an object of the invention is to provide a sectional shank screw driver, the sections of which are universally connected, whereby a screw may be turned home, while the shank of the screw driver is in different positions.

A further object of the invention is the provision of a screw driver of this kind, which may be used in obscure places.

In practical fields, the details of construction may necessitate alterations falling within the scope of what is claimed.

The invention comprises further features and combination of parts, as hereinafter set forth, shown in the drawings, and claimed.

In the drawings:—

Figure 1 is a view in elevation of the improved screw driver, constructed in accordance with the invention, showing the screw driver section in dotted lines in another position.

Fig. 2 is a view partly in longitudinal section and partly in elevation, more clearly showing the structural features thereof.

Referring more especially to the drawings, 1 designates a suitable handle, which is provided with a ferrule 3. A shank 2 is fitted into the handle 1, there being a transverse pin 4 extending through the ferrule, the lower part of the handle, and through the shank, thereby securing said parts together. The lower part of the shank 2 has a shoulder 5 and 6 denotes the screw driver section, the lower end of which terminates in a screw engaging end 7, while the other end is connected to the lower end of the shank 2 below the shoulder 5 by means of a universal joint 8. This universal joint comprises the forks 9 and 10, which form integral parts of the section 6 and shank 2, respectively, and the ball or member 11, which is provided with the right angle extending lugs 12 which engage said forks. A suitable washer 13 is mounted upon the shank 2 to engage the shoulder 5. A sleeve 14 is loosely mounted on the shank 2 between the washer 13 and the handle. The lower end of this sleeve is provided with an integral circular disk 15. The screw driver section 6 is provided with a reduced part 16, on which a split sleeve 17 is mounted. The split ends of this sleeve 17 terminate in ears 18, between which the substantially right angled end 19 of the link 20 is pivoted upon the pin 21. A suitable collar 22 is held upon the sleeve 14 by means of the set screw 23. It is to be noted that the collar 22 may be adjusted vertically and axially on said sleeve 14. The upper end portion of the link 20 terminates in laterally extending forks 24, which are in turn pivoted on the lugs 25 of the collar 22 at diametrically opposite points of said collar. The circular disk 15 of the sleeve 14 has a notch 26, which is engaged by the link 20, that is when the screw driver section 6 is disposed in exact vertical axial alinement with the shank 2, so as to cause the link to rotate or move with the sleeve 14 and disk 15, all as one body. For instance, when turning a screw home, there is a tendency to cause the link to turn with the screw driver section 6, owing to the frictional contact between the sleeve 17 and the shoulders at the opposite ends of the reduced part 16, hence, by the engagement of the link with the disk 15, such rotation or movement of the link is prevented. By loosening the set screw 23, the collar 22 may be adjusted upwardly on the sleeve 14, thereby holding the screw driver section on an angle, as shown in dotted lines in Fig. 1, whereby a screw may be turned home, that is, a screw that is difficult to get at with a straight screw driver.

The invention having been set forth, what is claimed as new and useful is:—

1. In a screw driver, the combination with a sectional shank, one section bearing a handle and the second section bearing a driver, of a universal joint connecting said sections, a sleeve loosely mounted on the handle section, a collar adjustably mounted on the sleeve, a collar rotatably mounted upon the driver section, and an arm pivoted to and connecting said collars.

2. In a screw driver, the combination with a sectional shank, one section bearing a handle and the second section bearing a driver, of a universal joint connecting said sections, a sleeve loosely mounted on the handle section, a collar adjustably mounted on the sleeve, a collar rotatably mounted upon the driver section, and an arm pivoted to and connecting said collars, one end of the sleeve having a disk provided with a notch in its marginal portion to be engaged by the arm when the two sections are axially alined.

In testimony whereof I have signed my name to this specification in the presence of two subscribing witnesses.

GEORGE TOWNILL.

Witnesses:
 STEPHEN L. WYLIE,
 GEO. B. LUCE.